United States Patent
Culbert et al.

[15] 3,641,744
[45] Feb. 15, 1972

[54] AIR FILTER FOR TRUCKS

[72] Inventors: Robert M. Culbert, Manhattan Beach; Richard V. Southworth, Marina Del Rey, both of Calif.

[73] Assignee: Farr Company, El Segundo, Calif.

[22] Filed: July 22, 1969

[21] Appl. No.: 843,587

[52] U.S. Cl. ................................55/319, 55/337, 55/385, 55/428, 55/461, 55/466, 55/481, 55/514, 55/521, 180/54, 180/69
[51] Int. Cl. ..........................................B01d 50/00
[58] Field of Search............55/315, 318, 319, 337, 320–326, 55/385, 497, 461, 466, 498–500, 514, 521, 428, 481, 306; 180/54, 69; 123/119 CD

[56] References Cited

UNITED STATES PATENTS

| | | | |
|---|---|---|---|
| 1,859,644 | 5/1932 | Altgelt | 180/54 |
| 3,137,553 | 6/1964 | Billey | 55/DIG. 28 |
| 3,490,211 | 1/1970 | Cartier | 55/500 |
| 470,403 | 3/1892 | Robinson | 55/322 |
| 1,522,111 | 1/1925 | Franck-Philipson | 55/482 |
| 1,865,987 | 7/1932 | Whittaker | 55/332 |
| 2,095,586 | 10/1937 | Algard | 55/330 |
| 2,277,646 | 3/1942 | Johnson | 55/424 |
| 2,319,894 | 5/1943 | Vokes | 55/521 |
| 2,414,564 | 1/1947 | Silverman et al. | 55/341 |
| 3,378,994 | 4/1968 | Farr | 55/324 |
| 3,402,531 | 9/1968 | Farr | 55/499 |
| 3,436,900 | 4/1969 | Evens et al. | 55/468 |

FOREIGN PATENTS OR APPLICATIONS

| | | | |
|---|---|---|---|
| 688,932 | 3/1953 | Great Britain | 123/119 |

*Primary Examiner*—Bernard Nozick
*Attorney*—Lyon & Lyon

[57] ABSTRACT

A compact air filter adapted for mounting in the limited space in the engine compartment of a truck and on the truck engine which permits the filtered air to be supplied directly from the filter to the engine intake and minimizes an air pressure drop. The incoming air to the filter is introduced at the extreme front of the truck with the filter first continually removing and discharging moisture from the incoming air and then passing the air through a replaceable flow-through filter cartridge comprised of a plurality of pleated paper panels arranged in a zigzag stacked relationship to provide a maximum filter area.

7 Claims, 6 Drawing Figures

ROBERT M. CULBERT
RICHARD V. SOUTHWORTH
INVENTORS.

BY Lyon & Lyon

ATTORNEYS

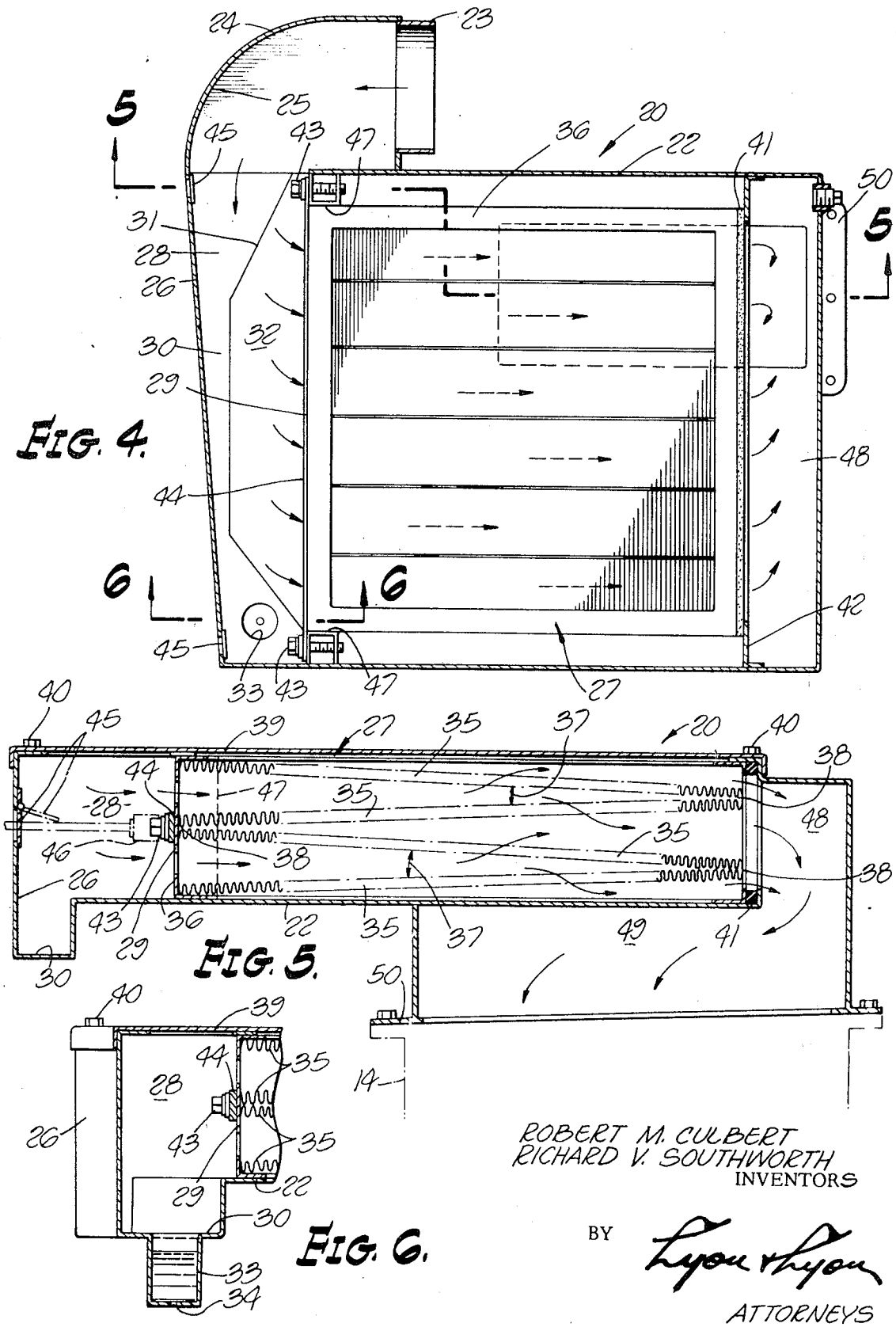

AIR FILTER FOR TRUCKS

This invention relates to filters for the air intake of truck engines and in particular is directed to a compact form of such a filter adapted to fit within the engine compartment for minimizing the pressure drop to the engine without sacrificing filter capacity.

The necessity of filtering the intake air for internal combustion engines to prevent damage and premature wear is well known. For large trucks there are a number of factors which dictate the necessity of providing an intake air filter having high dust-removal efficiency such as, the high cost of the truck engine, the adverse environmental conditions commonly encountered, the high number of operating hours, the expected dependability of engine operation, etc. Moreover, the high volumetric rate of air ingestion of internal combustion engines for large trucks requires the air filter to have high air flow capacity. As a result of these requirements the conventional air filters for large trucks are usually of such a large size as to preclude the mounting of the filter directly on the engine or, in some situations, even within the engine compartment. Thus, ducting must be provided for conducting the air from the filter to the intake which produces an air pressure drop and results in a reduction in engine efficiency.

Further, it had heretofore been conventional with most types of vehicles, including large trucks, to take the supply of air for the air filter from within the engine compartment or some other protected location whereby a minimum of rain and road moisture will be supplied to the filter which otherwise would impair the operation of or damage the filter. However, depending on the location of the air filter, this may entail still further ducting to supply the incoming air to the filter with an additional undesirable pressure drop. Moreover, the air taken from within the engine compartment will be at a higher temperature due to the air flowing through the radiator and the heat of the engine and as such is less desirable for ingestion by the engine than the cooler environmental air.

In summary it is a principal object of this invention to provide for trucks a novel form of intake air cleaner of a sufficiently compact size for mounting on the engine intake and adapted to receive a cartridge having a large area of filter media compactly arranged wherein the filter is adapted to remove moisture from the air before passing the air through the filter media whereby cool air from the front of the truck may be employed as the intake air.

Another object of this invention is to provide a novel form of air filter for large trucks wherein moisture is removed from the incoming air by inertial separation and continually drained from the filter housing through a down spout having a flow restriction for maintaining a head of water in the down spout during operation to preclude the intrusion of air therethrough whereby the demoisturized air may be more readily filtered in a second portion of the filter. A further object of this invention is to provide such an arrangement wherein the second portion of the filter is comprised of the cartridge of pleated filter paper panels arranged in zigzag stacked relationship with a small included angle between panels whereby the maximum area of filter media is achieved.

Still another object of this invention is to provide a compact air filter for large trucks adapted to be mounted directly on the engine air intake comprising a generally flat rectangular housing with an air turning elbow for inertially separating moisture and means for continually discharging such moisture and adapted to receive a rectangular filter cartridge of pleated paper filter media.

Other objects and advantages of this invention will appear from the following description and the accompanying drawings, wherein:

FIG. 4 is a sectional plan view of the filter of this invention.

FIG. 5 is a sectional side view of the air filter taken substantially on the line 5—5 and illustrating in phantom lines the manner in which the filter cartridge is secured in place.

FIG. 6 is a fragmentary sectional side view taken substantially on the line 6—6 as shown in FIG. 4.

The drawings illustrate a particular form of the air filter of this invention having a specific shape and mounting arrangement specifically adapted to fit one model of truck. However, it will readily appear to those skilled in the art that by appropriate modifications to the size and shape of the housing, flanges and the like, the air filter of this invention may be adapted to fit any truck with equally advantageous results.

Figure 1:
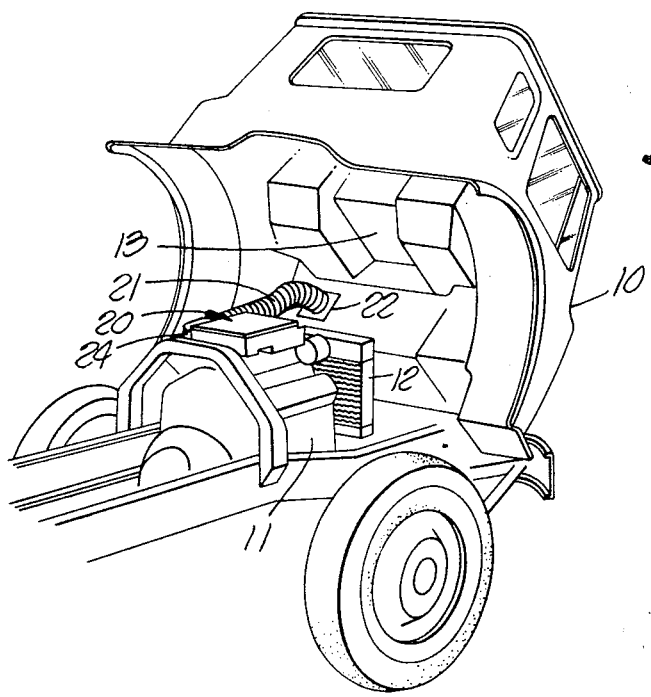
FIG. 1 is a perspective view of the engine compartment of a large truck of the "cabover" type illustrating the air filter of this invention mounted on top of the engine.

Referring now more particularly to FIG. 1, the truck is illustrated with the cab 10 in the raised position to expose the engine 11 from the rear. The radiator 12 is positioned immediately in front of the engine. When the cab 10 is lowered into operating position the underside of the cab as viewed in FIG. 1 forms the engine compartment and surrounds the engine relatively closely. Part of the engine compartment includes the central engine tunnel portion 13 which from the interior of the cab 10 comprises a substantially raised portion between the driver and passenger positions of the cab. This engine tunnel portion 13 is conventionally sized by the truck manufacturer to provide a minimum clearance between the engine and such portion whereby the engine tunnel portion 13 presents a minimum of obstruction within the cab 10. It is this minimal space between the engine and the walls of the engine compartment including the engine tunnel portion 13 that preclude the installation of a conventional truck air filter directly on top of the engine or, in some cases, even within the engine compartment.

Figure 2:
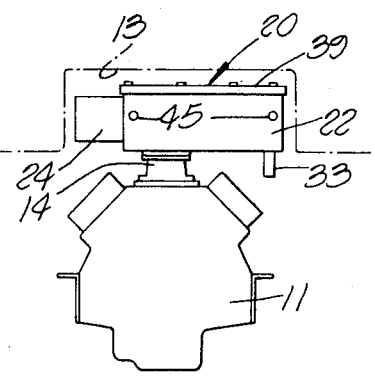
FIG. 2 is a schematic rear view of the truck engine with the air filter of this invention mounted thereon and illustrating in phantom lines the approximate position of the lower portion of the cab forming the top of the engine compartment.
Figure 3:
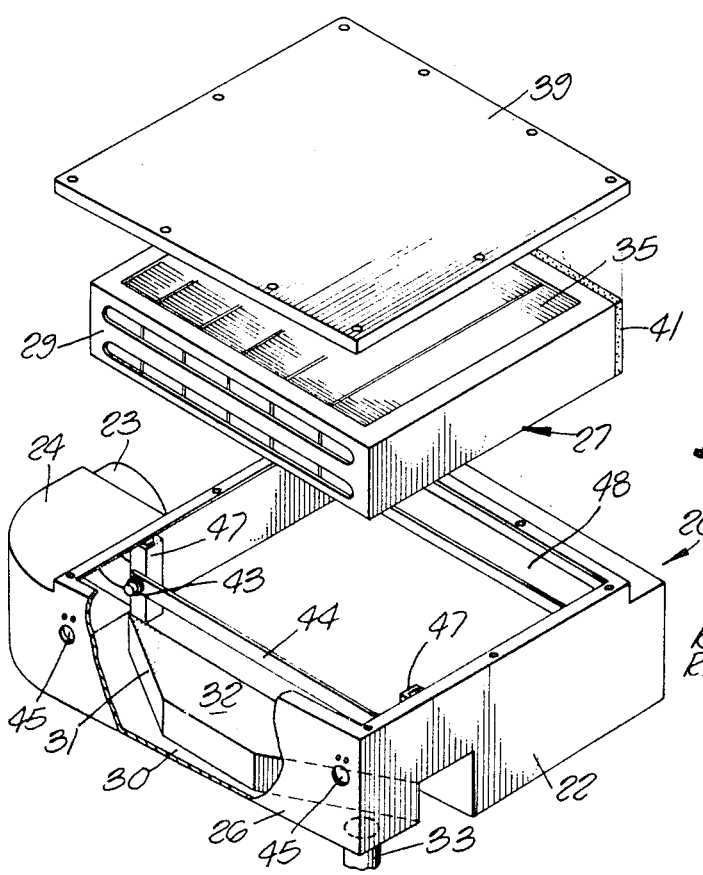
FIG. 3 is an exploded perspective view of the air filter of this invention with a portion of the housing shown in section.

Referring to both FIGS. 1 and 2, the air filter of this invention is generally designated 20 and is shown mounted in position on the engine 11. The minimal space between the engine 11 and the engine tunnel 13 is diagrammatically shown in FIG. 2 and it is within this space that the compact air filter 20 of this invention is mounted. An air intake duct 21 is connected from the housing of the air filter 20 to the front of the truck cab 10 at 22 which may be to the side or above the radiator 12 whereby the intake air is extracted from the very front of the vehicle to avoid heating of the air by the radiator 12 and engine 11 prior to introduction to the air filter. Moreover, the provision of this unrestricted air inlet at the front of the vehicle produces an advantageous air ram effect which forces air into the engine when the truck is in motion to provide a maximum of air to the engine. The duct 21 may be of any conventional form capable of flexing to accommodate the tilting of cab 10 as shown or in the alternative it may be rigid to extend forwardly and mate with an opening in the front of the cab in the operating position of the cab.

Referring now more particularly to FIGS. 3–6, the air filter 20 of this invention includes a generally rectangular housing 22 of substantially greater horizontal width and length than vertical thickness and may be of any convenient material such as sheet metal. An inlet connection 23 is provided on the side of the housing 22 for detachably connecting the duct 21 at a location near the rear of the housing. A turning elbow 24 mounted on the side of the housing causes the incoming air from duct 21 to be diverted laterally at substantially a right angle thereby inducing water droplets or moisture in the incoming air to impinge upon the curved inner surface 25 of the turning elbow 24 as well as the interior of the rear wall 26 of the housing 22. In this manner the excess moisture that is likely to be prevalent in the incoming air taken from the extreme front of the truck is removed from the incoming air prior to passing the air through the filter cartridge, generally designated 27 and hereinafter described more fully.

In order to more uniformly distribute the incoming air to the filter cartridge 27 the housing 22 includes an inlet plenum 28 between the rear wall 26 and the front 29 of the filter cartridge. The plenum 28 is tapered slightly converging in the direction of air flow as best shown in FIG. 4. The inlet plenum 28 includes a trough 30 extending below the level of the filter cartridge 27, as shown in FIGS. 5 and 6, and of the same depth as the inlet turning elbow 24 whereby moisture impinging on the surface 25 and the interior of rear wall 26 may migrate downwardly into the trough 30 and thereby be displaced from the path of air flow entering the filter cartridge 27. Of course some moisture will accumulate on the short wall 31 depending from the shelf 32 and also migrate to the trough 30.

Means are provided for continually removing the moisture extracted in the inlet plenum 28 to preclude clogging or reentrainment of such moisture and, as shown in the drawings, the means may comprise a downwardly depending tube or standpipe 33 at the extreme downstream end of the plenum 28. The standpipe 33 has an orifice 34 at its lower end to restrict the flow of water or air through the standpipe. The length of the standpipe 33 is selected on the basis of the pressure differential that will normally occur between the inlet plenum 28 and the surrounding atmosphere in the engine compartment and in the particular configuration illustrated in the drawings this pressure differential will be approximately 3 inches of water. The standpipe 33 is of a greater length than such pressure differential (measured by the water head) and thus a convenient length of standpipe for this particular embodiment would be approximately 4 inches. During operation of the truck in an environment causing an introduction of excessive moisture, the moisture will accumulate in trough 30 and migrate to the standpipe 33 with the initial amount of water entering standpipe 33 being precluded from exiting through orifice 34 due to air flowing in through orifice 34. However, upon the collection of 3 inches of water in standpipe 33 the water head plus the pressure in plenum 28 will equal the atmospheric pressure thereby stopping the inflow of air and upon the accumulation of additional water in standpipe 33 the increased water head will cause the excess water to drain through orifice 34. In this manner the inertially separated excess moisture is continually discharged from the filter housing 22 without the necessity of any pumps, valves or the like that might be susceptible or clogging. It has been found that the orifice 34 may be approximately ¼ inch in diameter thereby minimizing the possibility of clogging the orifice and yet this size is sufficiently small to preclude a counter-flow of air and water therethrough whereby the desirable 3-inch water head would not be maintained.

The required air filtration efficiency without excessive pressure drop through the filter 20 is achieved by the pleated paper filter cartridge 27 which, as illustrated, occupies most of the filter housing 22. The cartridge 27 includes a plurality of flat panels 35 of pleated paper filter media with four such panels shown in FIG. 5. Each panel 35 extends the full width and length of the cartridge 27. The panels 35 are mounted in zigzag stacked relationship in a frame 36 with a very small included angle 37 between the panels whereby the cartridge 27 is extremely thin for mounting in the thin flat housing 22. All four edges of each panel 35 are joined in sealed relationship to the frame 36 and adjacent edges of adjacent panels at the three locations 38 are sealably connected whereby air flowing into the converging space between panels 35 is compelled to flow through one of the panels thereby filtering such air. By this arrangement of pleated paper panels a large area of filter media is provided in a small volume and specifically in an extremely thin rectangular space to accommodate the space restrictions in the engine compartment as aforedescribed.

The filter cartridge 27 is removably mounted in the housing 22 for periodic replacement as required. The entire top 39 of housing 22 is removably secured by screws 40 spaced about the periphery of the top. The cartridge 27 is sealed in position to preclude the bypass of unfiltered air during operation by means of a compressible seal provided on and completely encircling the downstream end of the cartridge. An inwardly depending flange 42 on the housing 22 is adapted to be engaged by the seal 41 but does not extend inwardly a sufficient distance to inhibit air flow through the cartridge. The seal 41 is compressed into sealing relationship by means of a pair of bolts 43 at the front of the cartridge with a bar 44 extending between the bolts 43 across the width of the cartridge to uniformly urge the cartridge rearwardly. Due to the limited space and awkward position of bolts 43, a pair of ports are provided in the rear wall 26 with spring loaded hatches 45 covering such ports during operation of the truck. As shown by phantom lines in FIG. 5 a socketwrench 46 may be inserted through the port and hatch 45 for manipulating the bolts 43 during removal of the spent cartridge 27 and installation of a replacement cartridge 27. The cartridge 27 is precluded from shifting laterally by posts 47 which also serve to support the bolts 43.

At the outlet end of cartridge 27 the filter housing 22 is provided with an outlet plenum 48 extending the entire width of the housing. In addition the plenum 48 extends beneath the position of the filter cartridge 27 to a space designated 49 in FIG. 5. The filter housing 22 is provided with a flange 50 of the required shape, orientation and inclination (if any) to fit the intake 14 of the truck engine 11. The plenum 48 including space 49 serves to conduct the filtered air to the engine intake 14 with a minimum of pressure drop.

Thus it may be seen that by this invention there is provided a novel form of air filter particularly adapted for large trucks to provide the high volumetric capacity of air filtration required and yet occupy only the comparatively small space available in the engine compartment of such trucks. The filter of this invention is adapted for direct mounting on the engine air intake to minimize the ducting and resultant inefficiencies involved with conventional air filters mounted at a remote location on the truck. Specifically the flat configuration of the high capacity paper filter cartridge permits installation and use in the small space available in a cab-over type truck. Moreover, by the provision of a moisture eliminating section in the filter of this invention it is possible to use air taken directly from the extreme front of the vehicle rather than a protected location within the engine compartment whereby engine operation is improved.

We claim:

1. A compact intake air filter assembly for a truck vehicle comprising: a flat housing mounted substantially horizontal within the limited space of the truck engine compartment: said housing having an inlet, outlet means connected to the engine air intake, and a filter media in a rectangular filter cartridge of substantially greater horizontal width and length than vertical thickness including effective filter area substantially greater than the area between the vertical sides of said filter cartridge; said filter cartridge replaceably and transversely mounted in said housing and extending lengthwise therein and including means for airflow generally horizontally therethrough, an air inlet at the extreme front of the vehicle, conduit means extending from said air inlet to said housing for conducting the air from said air inlet into said housing, and a moisture accumulating and discharge section in said housing including means for separating moisture from the inlet air having a turning elbow adjacent said inlet positioned upstream of said filter cartridge for receiving the air from said conduit means before it flows into said filter cartridge and eliminating moisture therefrom, said moisture accumulating and discharge section including a trough below said filter cartridge to drain accumulated moisture and a tube which extends downwardly from said trough and housing for discharging the collected moisture from said housing, a restricted opening in the lower end of said tube for the discharge of the moisture therein, said tube having a length greater than the height of water column equal to the maximum pressure differential between atmospheric pressure and the pressure in said moisture accumulating and discharge section during the operation of the engine whereby a column of water is established and maintained in said tube to prevent the inflow of air into said restricted opening and allow continual draining of the collected moisture out said opening.

2. A compact intake filter assembly for a truck vehicle comprising: a housing mounted within the limited space in the truck engine compartment, having air outlet means connected to the engine air intake, an air inlet at the extreme front of the vehicle and conduit means for conducting the air from said air inlet to the housing, a moisture accumulating and discharge section in the housing communicating with said conduit means for receiving the air from said conduit means, a flat rectangular filter cartridge having plural panels of pleated filter paper arranged in zigzag stacked relation and being replaceably and transversely mounted in said housing in communicating relation between said moisture accumulating and discharge section and said air outlet for the air to flow therethrough and then on to the engine intake, said moisture accumulating and discharge section including means for separating moisture from the inlet air, a trough below said filter cartridge to drain the accumulated moisture and a tube which extends downwardly from said trough and housing for collecting moisture draining from said trough and then discharging said collected moisture from said housing, a restricted opening in the lower end of said tube for moisture discharge, said tube having a length greater than the height of water column equal to the maximum pressure differential between atmospheric pressure and the pressure in said moisture accumulating and discharge section during the operation of the engine whereby a column of water is established and maintained in said tube to prevent the inflow of air into said restricted opening and allow continual draining of the collected moisture out said opening.

3. A filter assembly for filtering the intake air for an internal combustion engine of a vehicle and adapted to fit in an engine compartment having restricted space, comprising a flat housing having horizontally spaced ends with an inlet plenum at one end and an outlet plenum at the opposite end, each said plenum extending across substantially that entire end of the housing, a generally rectangular filter cartridge sealably mounted in said housing and substantially filling the space in the housing between said plenums, said filter cartridge having a frame and a plurality of pleated paper filter panels mounted in said frame in zigzag stacked relation converging and diverging in the longitudinal direction between said plenums and sealed in said frame for causing air passing from the inlet plenum to the outlet plenum to pass through a filter panel for filtering such air, means to separate moisture from the air in said inlet plenum, said inlet plenum having a trough on the bottom extending below the level of the filter cartridge for accumulating the separated moisture, a tube mounted on said housing and extending downwardly from said trough for collecting moisture accumulated in said trough, said tube having an opening at its lower end for draining the collected moisture and said tube having a length greater than the height of water column equal to the maximum pressure differential between atmospheric pressure and the pressure in the inlet plenum during operation of the engine for maintaining a column of collected moisture in said tube during operation for continually draining such moisture from the housing, said inlet plenum having an air inlet on one lateral end, conduit means connected to said air inlet and extending forwardly for receiving fresh air at the front of the vehicle, and said outlet plenum having means for connecting to the engine intake for supplying filtered air thereto.

4. The filter assembly of claim 3 wherein said moisture separating means comprises a turning elbow adjacent said air inlet to laterally divert the air entering said inlet plenum and induce inertial separation of the moisture in the air which first accumulates on the walls of said inlet plenum.

5. The filter assembly of claim 3 wherein said housing has a removable top cover at least as large as the area between said plenums and said filter cartridge is removable and replaceable through the top of the housing with said top cover removed.

6. The filter assembly of claim 3 wherein means are provided for fixedly and sealably mounting said filter cartridge in said housing to prevent the bypass of unfiltered air into the engine intake.

7. The filter assembly of claim 6 wherein said sealing means includes a flexible gasket between said frame and said housing and means to compress said gasket between said housing and said frame.

* * * * *